(12) United States Patent
Chen et al.

(10) Patent No.: US 8,975,818 B2
(45) Date of Patent: Mar. 10, 2015

(54) LED ILLUMINATION DEVICE AND VALIDATION METHODOLOGY OF LED ILLUMINATION DEVICE'S LIFESPAN

(75) Inventors: Fang Chen, Zhejiang (CN); Yehua Wan, Zhejiang (CN); Jinxiang Shen, Zhejiang (CN)

(73) Assignee: Zhejiang Shenghui Lighting Co., Ltd., Xiuzhou Industrial Park, Jiaxing, Zhejiang Province (CN)

( * ) Notice: Subject to any disclaimer, the term of this patent is extended or adjusted under 35 U.S.C. 154(b) by 0 days.

(21) Appl. No.: 14/130,928

(22) PCT Filed: Jul. 19, 2012

(86) PCT No.: PCT/CN2012/078851
§ 371 (c)(1),
(2), (4) Date: Jan. 4, 2014

(87) PCT Pub. No.: WO2013/185404
PCT Pub. Date: Dec. 19, 2013

(65) Prior Publication Data
US 2014/0145622 A1    May 29, 2014

(30) Foreign Application Priority Data
Jun. 13, 2012 (CN) .......................... 2012 1 0194461

(51) Int. Cl.
*H05B 33/08* (2006.01)
*G01J 1/42* (2006.01)
(Continued)

(52) U.S. Cl.
CPC ........ *H05B 33/0884* (2013.01); *H05B 33/0803* (2013.01); *G01J 1/42* (2013.01); *G01J 2001/4247* (2013.01); *F21V 3/00* (2013.01);
(Continued)

(58) Field of Classification Search
None
See application file for complete search history.

(56) References Cited

U.S. PATENT DOCUMENTS 7,432,667 B2 * 10/2008 Callewaert et al. ........... 315/307
2006/0273744 A1 * 12/2006 Callewaert et al. ........... 315/308
(Continued)

FOREIGN PATENT DOCUMENTS

CN    101452044 A    6/2009
CN    101937062 A    1/2011
(Continued)

OTHER PUBLICATIONS

He, Weili et al.; Test method of life-time and reliability evaluation for high-power LED, 1-14 Journal of Applied Optics, Jul. 2008, vol. 29, No. 4, pp. 533-536 and 561, ISSN 1002-2082.

*Primary Examiner* — Crystal L Hammond
(74) *Attorney, Agent, or Firm* — Global IP Services; Tianhua Gu

(57) ABSTRACT

A LED illumination device and validation methodology of LED illumination device's lifespan, comprises a controller, timing chip and low-voltage DC power supply, the controller is connected to the display terminal, the timing chip is positioned inside the LED illumination device, so as to get real-time recording of the operating time of the LED illumination device which is transmitted to the display terminal for display; meanwhile, a light sensor is placed in the luminous zone to obtain luminosity data so as to measure real-time luminous maintenance rate. When the measured luminous maintenance rate gets lower than the luminous maintenance rate predetermined for critical lifespan, the operating time recorded by the LED illumination device at this moment is the lifespan of this LED illumination device.

12 Claims, 1 Drawing Sheet

(51) Int. Cl.
 *F21V 3/00* (2006.01)
 *F21V 23/00* (2006.01)
 *F21V 23/04* (2006.01)
 *F21Y 101/02* (2006.01)

(52) U.S. Cl.
 CPC ........... *F21V 23/004* (2013.01); *F21V 23/0464* (2013.01); *F21Y 2101/02* (2013.01); *Y02B 20/42* (2013.01)
 USPC ............................ 315/129; 315/152; 315/291

(56) References Cited

U.S. PATENT DOCUMENTS

2010/0270933 A1* 10/2010 Chemel et al. ................ 315/130
2011/0001436 A1* 1/2011 Chemel et al. ................ 315/291
2011/0001438 A1* 1/2011 Chemel et al. ................ 315/297

FOREIGN PATENT DOCUMENTS

| CN | 202018569 U | 10/2011 |
| JP | 2005069938 A | 3/2005 |

* cited by examiner

LED ILLUMINATION DEVICE AND VALIDATION METHODOLOGY OF LED ILLUMINATION DEVICE'S LIFESPAN

CROSS REFERENCE TO RELATED PATENT APPLICATION

The present application is the US national stage of PCT/CN2012/078851 filed on Jul. 19, 2012, which claims the priority of the Chinese patent application No. 201210194461.8 filed on Jun. 13, 2012, which application is incorporated herein by reference.

FIELD OF THE INVENTION

This invention relates to the technical field of LED illumination, more particularly, an LED illumination device with time or lifespan management function and lifespan validation methodology.

BACKGROUND OF THE INVENTION

In recent years, innovative energy-saving illumination products and technologies have been advancing, particularly LED illumination products which are of high luminous efficacy and long lifespan, luminous efficacy increased 5-10 times and lifespan extended 30-50 times compared to incandescent lamp. Therefore, the energy-saving reformation of various conventional illuminations has been recognized by businesses and users, more particularly EMC (Energy Management Contract) mode has attracted more and more attention.

The theoretical lifespan (Note: Product lifespan refers to the service time till the luminous flux of the product decreases to 70%.) of innovative energy-saving illumination products as LED is very long, however, since there is no feasible accelerated ageing test methodology to validate its lifespan, the luminous flux maintenance factor at 6000 hours or even longer with conventional ageing is commonly adopted at present to judge the lifespan. Since the technology of innovative energy-saving illumination as LED is developing very fast, its technology may already be out-of-date normally when a product lifespan has just been or not yet been sufficiently validated, causing both waste of time and money for LED manufacturers. As for users, unless a failure happens to the product in a short time, the actual operating time of the product can not be accurately measured, thus it's hard to validate the lifespan of the illumination product and this might offend their legal rights. For instance, the nominal lifespan of a product is 25000 hours, but if the product fails at 20000 hours, it's hard for the user to provide evidence or defend his/her legal rights.

Therefore, lifespan assessment and validation of innovative energy-saving illumination products as LED is a severe issue besetting manufacturers and users.

SUMMARY OF THE INVENTION

To overcome the defects of the above mentioned prior art, this invention provides an LED illumination device and lifespan validation methodology which enables timely measurement of the product's operating time and display of the product's lifespan.

The technical scheme of this invention is realized as below:

An LED illumination device with time management function, wherein a controller, timing chip and low-voltage DC power supply are installed inside the LED lamp, wherein the controller is connected directly or indirectly to the display terminal.

Preferably, the low-voltage DC power supply is connected to the controller while the controller is connected to the timing chip. The low-voltage power supply supplies electricity to the controller and timing chip.

Preferably, the said controller is a microcontroller or digital integrated circuit controller.

Preferably, when the controller is connected directly to the display terminal, it means the display terminal is installed in the LED illumination device, wherein the data obtained by the controller is recorded or displayed on the display terminal. The said display terminal is LCD display.

Preferably, when the controller is connected indirectly to the display terminal, it means the display terminal and LED illumination device are separately positioned, the display terminal being connected wiredly or wirelessly. The said display terminal is mobile phone, PC, etc.

To measure LED's lifespan more accurately, preferably a light sensor is also installed in the luminous zone of the LED illumination device, wherein the said light sensor is connected to the controller, and the controller obtains luminosity which is converted to luminous flux and luminous maintenance rate then recorded or transmitted to the display terminal.

To make it easy to install, preferably the said light sensor is mounted to the substrate used to fix the LED light source.

To better obtain luminosity data, preferably the said light sensor is positioned in the center of the substrate.

To avoid effect from potential external strong light, preferably the light sensor is covered by a cap.

To make sure the light sensor receives only the light from inside the lamp and ensures accuracy of the data, preferably there is a masking blade placed in the lamp shade of LED illumination device above the light sensor.

A validation methodology of LED illumination device's lifespan, wherein a controller, timing chip and low-voltage DC power supply are installed inside the LED illumination device, wherein when the power is on, the LED illumination device starts to illuminate, meanwhile the timing chip starts to time. The timing data is transmitted to the controller, then recorded or displayed on the display terminal. The timing chip is equipped with power-off protection function, timing continuing when the power is on again; when the LED illumination device can not be lighted, the time displayed at this moment is the lifespan of this LED illumination device.

Preferably, a light sensor is placed in the luminous zone of the LED lamp. The light sensor starts reading after the LED illumination device begins working for the first time and warms up for 20~60 minutes, and this reading is set as the initial luminosity value, meanwhile, the luminosity data is transmitted to the controller. Afterwards, the reading is updated every 20~30 minutes. The controller compares, by its built-in program, the real-time luminosity values to the initial luminosity value, which are converted to luminous flux and luminous maintenance rate then transmitted to the display terminal for display. When the measured luminous maintenance rate gets lower than the luminous maintenance rate predetermined for critical lifespan, the operating time recorded by the LED illumination device at this moment is the lifespan of this LED illumination device.

To obtain the initial luminosity value more accurately, preferably it starts reading after the LED illumination device begins working for the first time and warms up for 20~60 minutes, afterwards the reading is updated every 20~30 minutes, 3~5 times in succession. Comparing the later readings with the first reading, if the change rate stays within 10%, the controller will take any of the readings or the average value as initial luminosity value, while if the change rate exceeds 10%, the controller will discard the readings. In this way, a more accurate initial luminosity value is obtained when the LED illumination device operates stably.

To avoid data loss due to failure of the LED illumination device, preferably when the LED illumination device does not work due to various defects, the controller is able to provide the recorded or displayed data through external low-voltage power supply. The controller is reserved with standard power supply and data transmission interface, such as USB interface. When the LED illumination device does not work due to defect, the controller is able to restart working and record or read relevant data by inputting external low-voltage DC power supply via the interface.

The design philosophy and benefits of this invention by adopting above mentioned technical scheme lie in:

In this invention a timing chip is positioned inside the LED illumination device, so as to get real-time recording of the operating time of the LED illumination device which is transmitted to the display terminal for display; meanwhile, a light sensor is placed in the luminous zone to obtain luminosity data so as to measure real-time luminous maintenance rate. When the measured luminous maintenance rate gets lower than the luminous maintenance rate predetermined for critical lifespan, the operating time recorded by the LED illumination device at this moment is the lifespan of this LED illumination device.

This invention is able to record the operating time and corresponding luminous maintenance rate of LED illumination device, reflecting accurately the actual lifespan of the illumination products of high efficacy and long lifetime as LED illumination device, thus providing accurate information for lifespan assessment of high efficient illumination products as LED in all business modes.

DETAILED DESCRIPTION OF THE PREFERRED EMBODIMENTS

Figure 1:
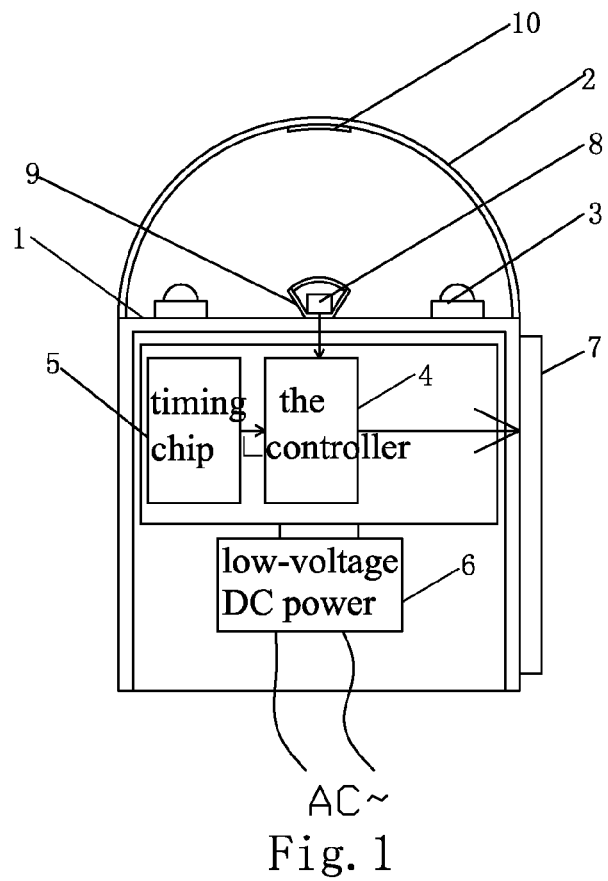
FIG. 1 is a schematic diagram of the illumination device in the embodiment.
Figure 3:
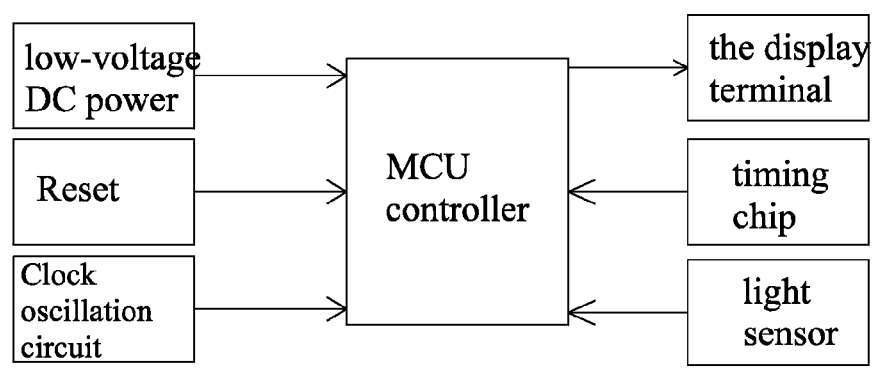
FIG. 3 is a circuit control diagram of all modules of the LED illumination device in the embodiment.

Detailed description of the preferred embodiments of this invention as below:

Embodiment: an LED illumination device with time management function as illustrated in FIG. 1, in which substrate 1 and lamp shade 2 are placed at the upper end of LED illumination device, wherein a plurality of LED light source 3 are fixed on substrate 1. Controller 4, timing chip 5 and low-voltage DC power supply 6 are installed inside the illumination device, wherein the said controller 4 refers to MCU controller. As illustrated in FIG. 1, FIG. 3, low-voltage DC power supply 6 is connected to controller 4, controller 4 connected to timing chip 5, controller 4 directly connected to display terminal 7, and the said terminal 7 refers to the LCD display positioned on the side of LED illumination device.

Light sensor 8 is also installed inside in the luminous zone of the LED illumination device, wherein the said light sensor 8 is connected to controller 4, and controller 4 obtains luminosity which is converted to luminous maintenance rate that transmitted to display terminal 7. The said light sensor 8 is positioned in the center of substrate 1. Light sensor 8 is covered by cap 9. Masking blade 10 is placed in the lamp shade of LED illumination device above light sensor 8.

Figure 2:
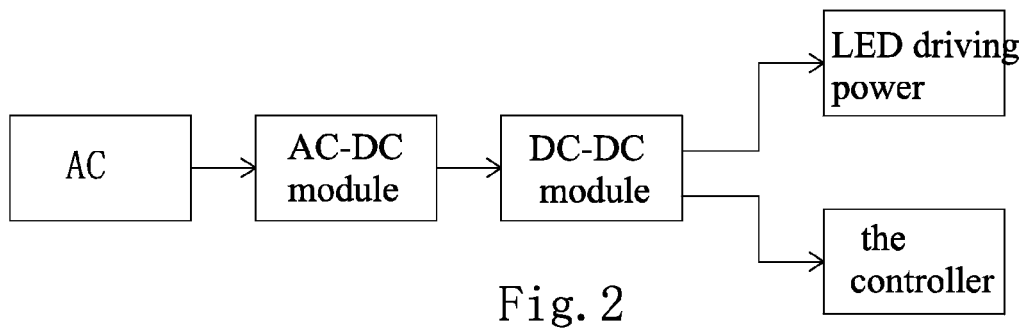
FIG. 2 is a schematic diagram of another type of power supply of MCU controller in the embodiment.

Since low-voltage DC power supply is required for modules as controller 4, timing chip 5, normally the LED driving power source outputs low-voltage DC, thus low-voltage DC power supply 6 can supply power directly to the controller; if any other type of driving power source is used, as illustrated in FIG. 2, AC-DC module and DC-DC module are needed for voltage conversion.

When the power is on, the LED illumination device starts to illuminate, meanwhile the timing chip starts to time. The timing data is transmitted to the controller, and then displayed on the display terminal timely. The timing chip is equipped with power-off protection function to ensure the time is memorized after power off, and timing continues when the power is on again; when the LED illumination device can not be lighted, the time displayed at this moment is the lifespan of this LED illumination device.

Furthermore, the light sensor starts reading after the LED illumination device begins working for the first time and warms up for 30 minutes; afterwards, the reading is updated every 30 minutes, 3 times in succession. Comparing the later readings with the first reading, if the change rate stays within 10%, the controller will take the average value as initial luminosity value. Meanwhile, the luminosity data is transmitted to MCU controller, hereafter the reading is updated every half hour. Moreover, the light sensor does not respond to the decrease of light intensity at the instant of power cut. The controller compares, by its built-in program, the real-time luminosity values to the initial luminosity value, which are converted to luminous flux and luminous maintenance rate then transmitted to the display terminal for display. When the measured luminous maintenance rate gets lower than the luminous maintenance rate predetermined for critical lifespan, the operating time recorded by the LED illumination device at this moment is the lifespan of this LED illumination device. The luminous maintenance rate for critical lifespan can be set freely in accordance with actual situation, normally 70% for instance.

What is claimed is:

1. An LED illumination device with time management function, characterizing in that a controller, timing chip and low-voltage DC power supply are installed inside the LED lamp, wherein the controller is connected directly or indirectly to the display terminal, a light sensor is also installed in the luminous zone of the LED illumination device, wherein the said light sensor is connected to the controller, and the controller obtains luminosity which is converted to luminous flux and luminous maintenance rate then recorded or transmitted to the display terminal.

2. The LED illumination device with time management function as set forth in claim 1, characterizing in that low-voltage DC power supply is connected to the controller while the controller is connected to the timing chip.

3. The LED illumination device with time management function as set forth in claim 1, characterizing in that the said controller is a microcontroller or digital integrated circuit controller.

4. The LED illumination device with time management function as set forth in claim 1, characterizing in that when the controller is connected directly to the display terminal, it means the display terminal is installed in the LED illumination device, wherein the data obtained by the controller is recorded or displayed on the display terminal.

5. The LED illumination device with time management function as set forth in claim 1, characterizing in that when the controller is connected indirectly to the display terminal, it means the display terminal and LED illumination device are separately positioned, the display terminal being connected wiredly or wirelessly.

6. The LED illumination device with time management function as set forth in claim 1, characterizing in that the said light sensor is mounted to the substrate used to fix the LED light source.

7. The LED illumination device with time management function as set forth in claim 6, characterizing in that the said light sensor is positioned in the center of the substrate.

8. The LED illumination device with time management function as set forth in claim 1, characterizing in that the light sensor is covered by a cap.

9. The LED illumination device with time management function as set forth in claim 1, characterizing in that there is a masking blade placed in the lamp shade of LED illumination device above the light sensor.

10. A validation methodology of LED illumination device's lifespan, characterizing in that a controller, timing chip and low-voltage DC power supply are installed inside the LED illumination device, wherein when the power is on, the LED illumination device starts to illuminate, meanwhile the timing chip starts to time; the timing data is transmitted to the controller, then recorded or displayed on the display terminal; the timing chip is equipped with power-off protection function, timing continuing when the power is on again; when the LED illumination device can not be lighted, the time displayed at this moment is the lifespan of this LED illumination device. a light sensor is placed in the luminous zone of the LED lamp. The light sensor starts reading after the LED illumination device begins working for the first time and warms up for 20~60 minutes, and this reading is set as the initial luminosity value, meanwhile, the luminosity data is transmitted to the controller; afterwards, the reading is updated every 20~30 minutes; the controller compares, by its built-in program, the real-time luminosity values to the initial luminosity value, which are converted to luminous flux and luminous maintenance rate then transmitted to the display terminal for display; and when the measured luminous maintenance rate gets lower than the luminous maintenance rate predetermined for critical lifespan, the operating time recorded by the LED illumination device at this moment is the lifespan of this LED illumination device.

11. The validation methodology of LED illumination device's lifespan as set forth in claim 10, characterizing in that it starts reading after the LED illumination device begins working for the first time and warms up for 20~60 minutes, afterwards the reading is updated every 20~30 minutes, 3~5 times in succession; and comparing the later readings with the first reading, if the change rate stays within 10%, the controller will take any of the readings or the average value as initial luminosity value, while if the change rate exceeds 10%, the controller will discard the readings.

12. The validation methodology of LED illumination device's lifespan as set forth in claim 10, characterizing in that when the LED illumination device does not work due to various defects, the controller is able to provide the recorded or displayed data through external low-voltage power supply.

* * * * *